UNITED STATES PATENT OFFICE.

MATHEW H. DEVEY, OF CHESTER, PENNSYLVANIA.

INSULATING COMPOUND.

SPECIFICATION forming part of Letters Patent No. 490,641, dated January 31, 1893.

Application filed January 30, 1892. Serial No. 420,369. (No specimens.)

*To all whom it may concern:*

Be it known that I, MATHEW H. DEVEY, a citizen of the United States, residing at Chester, in the county of Delaware and State of Pennsylvania, have invented certain new and useful Improvements in an Insulating Compound; and I do hereby declare the following to be a full, clear, and exact description of the invention, such as will enable others skilled in the art to which it appertains to make and use the same.

My invention relates to a composition to be used as a non-conductor for electrical purposes.

It consists of a compound composed of slag eight parts, and glass two parts, ground fine. Boiled linseed oil, driers, shellac and paraffine in sufficient quantities are used to reduce the above ingredients (after they have as above stated been ground or powdered) to a paste and to make the paste set quickly Portland or other cement may be used.

It is a well known fact that it is almost impossible to get the most effective service in underground conduits for many reasons, one of which is moisture, another is induction which, perhaps is the most serious drawback to underground wires. These objections are overcome by the use of my non-conductive material by lining the pipes and conduits and chambers therein through which the wires pass. To illustrate, I will refer to my patent No. 314,655 granted March 31, 1885. The drawings of said patent show that the conduit is divided into several compartments each of which is used by a separate company, one for telephone, the other for telegraph and still another for electric lighting wires, thus it will readily be seen that such chambers or compartments must be securely insulated from each other to prevent induction. I apply the above compound in the form of paste to the sides of said compartments. The paraffine, shellac and driers cause it to set quickly and give it a smooth finish. The sides of said compartments being of wood (in this instance) I first secure a wire netting to the same by means of porcelain nails then spread the compound on the wire netting.

This composition may be used with equal effect for switches or cut outs as well as for flooring in electric light stations.

The process of mixing the ingredients to these compounds consists in mixing and beating them together in a mass with coal oil or petroleum or linseed oil and driers until reduced to a fine pulp. The compound in the form of paste is then applied to the object it is desired to insulate. If the surface of such composition should become rough by use a mixture of linseed oil, driers and shellac may, if desired be applied thus making the surface very smooth.

What I claim and desire to secure by Letters Patent is:

1. A composition of matter for electrical purposes consisting of powdered slag, glass and a binding medium in the proportions specified.

2. A composition of matter for electrical purposes consisting of powdered slag, glass, boiled linseed oil, driers, shellac and paraffine in the proportions specified.

In testimony whereof I affix my signature in presence of two witnesses.

MATHEW H. DEVEY.

Witnesses:
N. W. GARVINE,
THOMAS B. BEIZZARD.